(12) United States Patent
Jungmann et al.

(10) Patent No.: US 10,634,201 B2
(45) Date of Patent: Apr. 28, 2020

(54) DISC BRAKE, MORE PARTICULARLY FOR COMMERCIAL VEHICLES

(71) Applicant: WABCO Europe BVBA, Brussels (BE)

(72) Inventors: Hans-Christian Jungmann, Gorxheimertal (DE); Peter Moser, Waibstadt (DE); Vitalij Scherer, Mannheim (DE); Ralf Grosskopf, Mannheim (DE)

(73) Assignee: WABCO EUROPE BVBA, Brussels (BE)

( * ) Notice: Subject to any disclaimer, the term of this patent is extended or adjusted under 35 U.S.C. 154(b) by 222 days.

(21) Appl. No.: 15/578,713

(22) PCT Filed: Jun. 6, 2016

(86) PCT No.: PCT/EP2016/000935
§ 371 (c)(1),
(2) Date: Dec. 1, 2017

(87) PCT Pub. No.: WO2016/206778
PCT Pub. Date: Dec. 29, 2016

(65) Prior Publication Data
US 2018/0106307 A1 Apr. 19, 2018

(30) Foreign Application Priority Data
Jun. 23, 2015 (EP) .................................... 15001864

(51) Int. Cl.
*F16D 125/32* (2012.01)
*F16D 55/22* (2006.01)
(Continued)

(52) U.S. Cl.
CPC ................ *F16D 55/22* (2013.01); *B60T 1/06* (2013.01); *B60T 13/12* (2013.01); *F16D 65/18* (2013.01);
(Continued)

(58) Field of Classification Search
CPC ...... F16D 55/22; F16D 65/18; F16D 2121/14; F16D 2125/28; F16D 2125/32; B60T 1/06; B60T 13/12
See application file for complete search history.

(56) References Cited

U.S. PATENT DOCUMENTS 5,379,867 A 1/1995 Macke et al.
5,819,884 A * 10/1998 Giering ................. F16C 19/502
188/71.9

(Continued)

FOREIGN PATENT DOCUMENTS

CN 102242786 A 11/2011
DE 102009023416 A1 12/2010
(Continued)

*Primary Examiner* — Thomas W Irvin
(74) *Attorney, Agent, or Firm* — Leydig, Voit & Mayer Ltd.

(57) ABSTRACT

A disk brake includes a brake disc, a brake shaft having a rotation axis that lies parallel to a main plane of the brake disc, a brake pad lying on a same side as the brake shaft relative to the brake disc, a pressure piece disposed between the brake shaft and the brake pad, a first limiting device configured to limit, to a predefined first extent, the displaceability of the pressure piece relative to the brake disc in a direction parallel to the rotation axis of the brake shaft, and a second limiting device configured to limit, to a predefined second extent, the displaceability of the brake shaft relative to the brake disc in a direction parallel to the rotation axis of the brake shaft, the second limiting device comprising a first stop on the pressure piece and a second stop on the brake shaft.

8 Claims, 4 Drawing Sheets

(51) Int. Cl.
  *F16D 65/18* (2006.01)
  *B60T 1/06* (2006.01)
  *B60T 13/12* (2006.01)
  *F16D 121/14* (2012.01)
  *F16D 125/64* (2012.01)
  *F16D 125/26* (2012.01)
(52) U.S. Cl.
  CPC ...... *F16D 2121/14* (2013.01); *F16D 2125/26* (2013.01); *F16D 2125/32* (2013.01); *F16D 2125/64* (2013.01)

(56) References Cited

U.S. PATENT DOCUMENTS

| | | | | |
|---|---|---|---|---|
| 5,833,035 | A | * | 11/1998 | Severinsson ............ F16D 65/18 188/72.7 |
| 6,354,407 | B1 | * | 3/2002 | Heinlein ................ F16D 65/18 188/71.1 |
| 8,590,675 | B2 | * | 11/2013 | Jungmann ............... F16D 65/18 188/71.9 |
| 9,453,545 | B2 | * | 9/2016 | Jungmann ............... F16D 65/18 |
| 10,161,445 | B2 | * | 12/2018 | Klaas .................... F16C 19/502 |
| 10,221,907 | B2 | * | 3/2019 | Sandberg ............... F16D 65/18 |
| 10,221,908 | B2 | * | 3/2019 | Henning ............... F16D 65/567 |
| 2013/0020153 | A1 | | 1/2013 | Moeller |
| 2016/0230826 | A1 | | 8/2016 | Osawa et al. |
| 2017/0307035 | A1 | * | 10/2017 | Henning ............... F16D 55/226 |
| 2019/0072146 | A1 | * | 3/2019 | Jungmann ............... F16D 65/18 |

FOREIGN PATENT DOCUMENTS

| | | |
|---|---|---|
| DE | 102010005909 A1 | 9/2011 |
| EP | 0569031 A1 | 11/1993 |
| EP | 1160477 A2 | 12/2001 |
| EP | 1789695 B1 | 5/2007 |
| EP | 3048324 A1 | 7/2016 |
| WO | WO 2015040652 A1 | 3/2015 |

* cited by examiner

DISC BRAKE, MORE PARTICULARLY FOR COMMERCIAL VEHICLES

CROSS REFERENCE TO RELATED APPLICATIONS

This application is a U.S. National Phase application under 35 U.S.C. § 371 of International Application No. PCT/EP2016/000935, filed on Jun. 6, 2016, and claims benefit to European Patent Application No. EP 15 001 864.6, filed Jun. 23, 2015. The International Application was published in German on Dec. 29, 2016 as WO 2016/206778 under PCT Article 21(2).

FIELD

The invention concerns a disk brake, and more particularly, a disk brake for commercial vehicles.

BACKGROUND

Disk brakes are known, for example from DE 10 2010 005 909 A1. According to this, so-called guide strips are provided which limit to a predefined extent the displaceability of both the pressure piece and the brake shaft relative to the brake disk in the direction parallel to the rotation axis of the brake shaft. The predefined extent is here zero or almost zero because the guide strips—as their name implies—are intended to guide the pressure piece or brake shaft in the axial direction on braking or on application of the brakes, but at the same time it must be guaranteed that said components do not seize.

In known disk brakes, the part of the guide strips intended to restrict the displaceability of the brake shaft lies deep inside the brake caliper, for which reason precise machining to ensure perfect function is difficult. In addition, deformation of the brake parts involved, in particular the brake caliper, following clamping on braking, acts in the sense of reducing the play between in particular the brake shaft and the relevant portion of the guide strip, which can lead to seizing.

SUMMARY

In an embodiment, the present invention provides a disc brake. The disk brake includes a brake disc, a brake shaft having a rotation axis that lies parallel to a main plane of the brake disc, a brake pad lying on a same side as the brake shaft relative to the brake disc, a pressure piece disposed between the brake shaft and the brake pad, a first limiting device configured to limit, to a predefined first extent, the displaceability of the pressure piece relative to the brake disc in a direction parallel to the rotation axis of the brake shaft, and a second limiting device configured to limit, to a predefined second extent, the displaceability of the brake shaft relative to the brake disc in a direction parallel to the rotation axis of the brake shaft, the second limiting device comprising a first stop on the pressure piece and a second stop on the brake shaft that cooperates with the first stop in the sense of limiting the displaceability. On actuation, the brake shaft presses the pressure piece and hence the brake pad against the brake disc.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
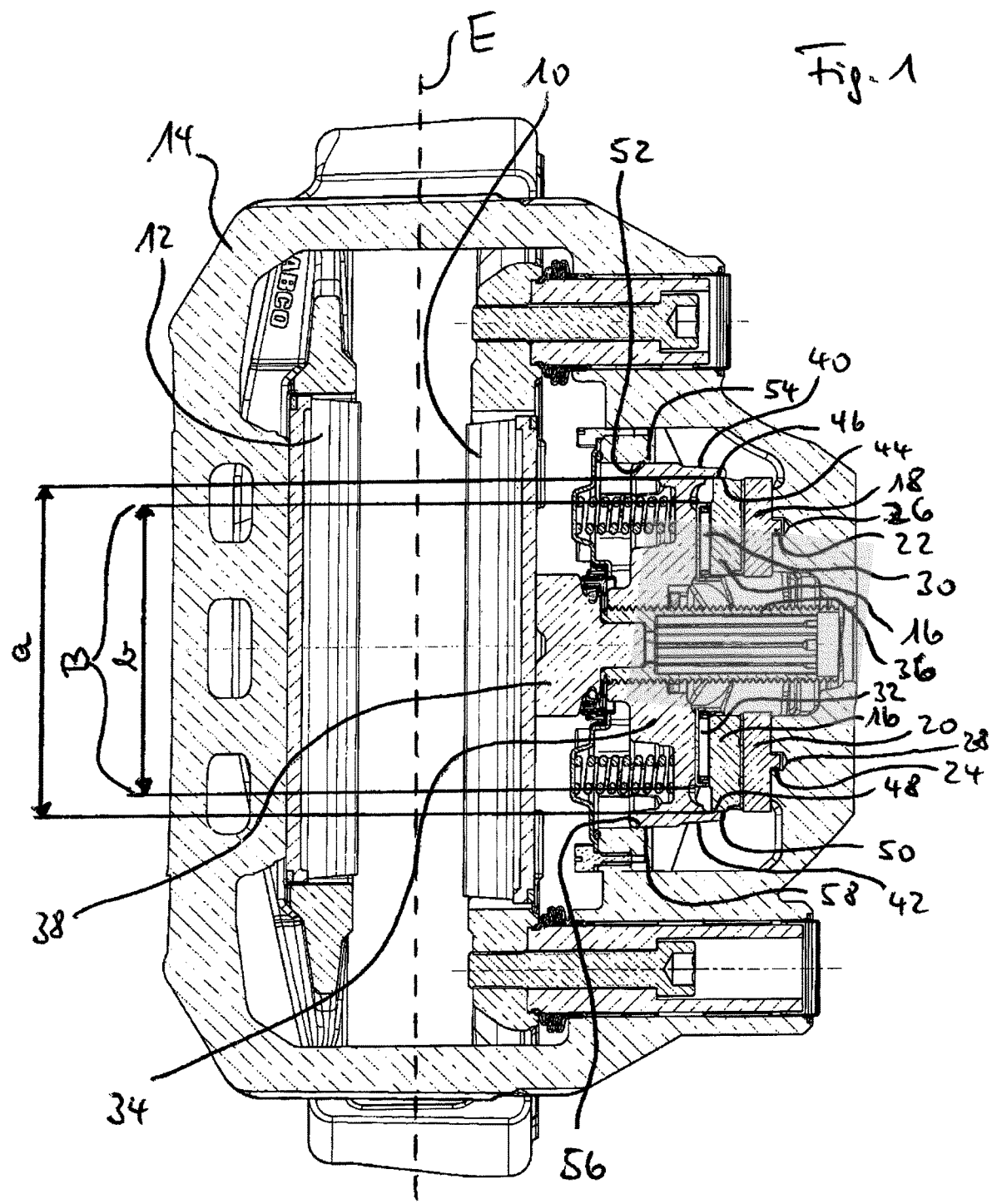
FIG. 1 is a diagrammatic sectional view from above of a disk brake according to an embodiment of the invention.
Figure 2:
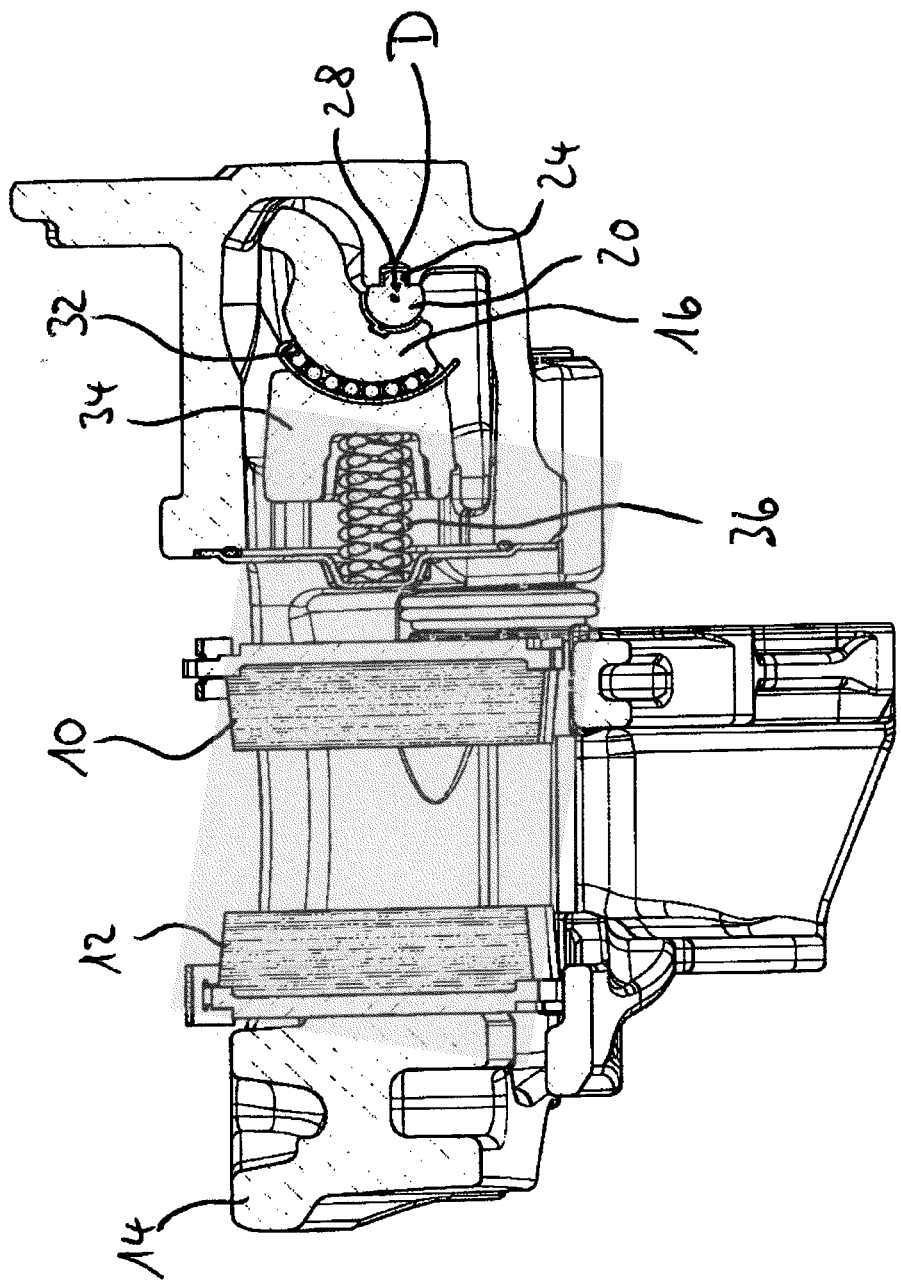
FIG. 2 is a diagrammatic sectional view from the side of the disk brake according to FIG. 1.
Figure 3:
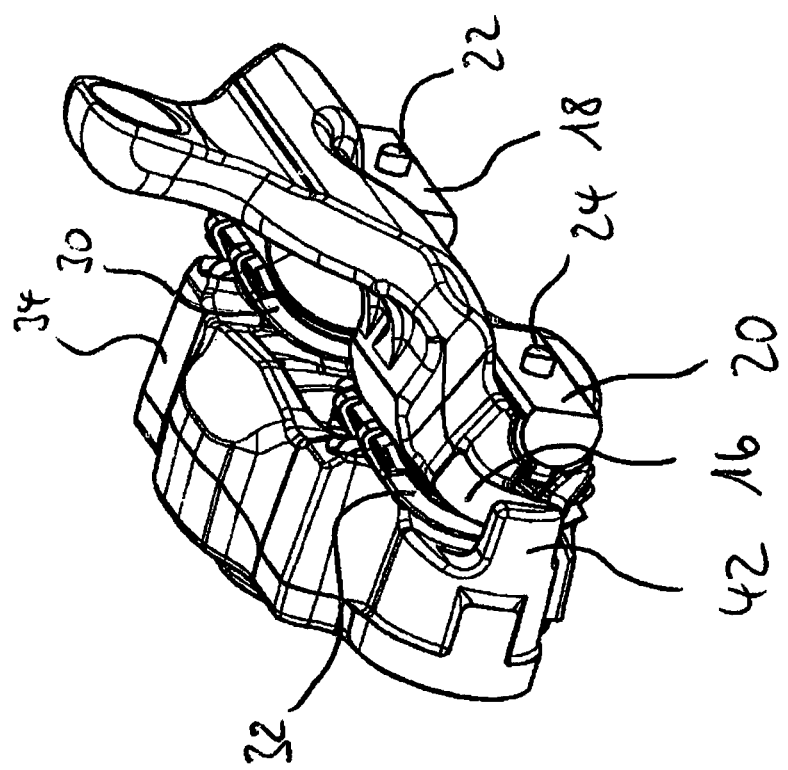
FIG. 3 is a diagrammatic perspective view of the application device of the disk brake according to FIG. 1.
Figure 4:
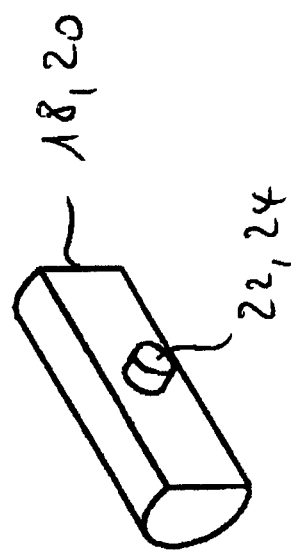
FIG. 4 is a diagrammatic perspective view of a sliding block of the disk brake according to FIG. 1.

Embodiments of the present invention provide for disk brakes in which production is simplified and seizing due to deformation on application is avoided. Embodiments of the invention provide a disk brake including a brake disk, a brake shaft, the rotation axis of which lies parallel to a main plane of the brake disk, a brake pad lying on the same side as the brake shaft relative to the brake disk, a pressure piece between the brake shaft and the brake pad, a first limiting device which limits to a predefined first extent the displaceability of the pressure piece relative to the brake disk in a direction parallel to the rotation axis of the brake shaft, and a second limiting device which limits to a predefined second extent the displaceability of the brake shaft relative to the brake disk in a direction parallel to the rotation axis of the brake shaft, wherein on actuation, the brake shaft presses the pressure piece and hence the brake pad against the brake disk.

According to embodiments of the invention, a second limiting device has a first stop on a pressure piece and a second stop on a brake shaft, which cooperates with the first stop in the sense of limiting the displaceability.

In other words, the second limiting device, i.e. the limiting device which restricts the displaceability of the brake shaft to the predefined second extent, is implemented in that the displaceability of the brake shaft relative to the pressure piece is limited. The limiting device for the pressure piece may here be configured as normal. In other words, according to embodiments of the invention, the displacement of the pressure piece is limited and the brake shaft is coupled to the pressure piece, such that this displaceability is limited not approximately absolutely but only relative to the pressure piece. As a result, the desired displaceability limitation is achieved for both elements, i.e. both the pressure piece and the brake shaft, without for example guide strips for the brake shaft needing to be provided inside the brake caliper.

Because the guide strips for the brake caliper are not essential, the production complexity is reduced. In addition, there is no danger of seizing with the said guide strips. On the contrary, the stops according to the invention (first stop on the pressure piece and second stop on the brake shaft) will, because of the existing geometries, move in the sense of increasing the play due to deformation during application of the brakes, so that seizing is reliably excluded.

EP 1 789 695 B1 describes a disk brake in which the pressure piece does not hold the brake shaft, as in embodiments of the present invention, but conversely the brake shaft holds the pressure piece. In this known disk brake, the problems described above with regard to production complexity and security against seizing still exist.

According to embodiments of the invention, it may be provided that the first stop lies outside the region in which, on braking, a clamping force originating from the brake shaft is applied to the pressure piece. This configuration has considerable mechanical advantages.

According to embodiments of the invention, it is preferably provided that the second limiting device comprises one, two or more shoulders on the pressure piece. The first stop, which cooperates with the second stop in the sense of limiting the displaceability of the brake shaft, may be formed on such a shoulder (or on several shoulders).

In the sense of a mechanical inversion, such a shoulder (or two or more) could also be formed on the brake shaft in order to implement the second stop.

In the case of two shoulders, according to embodiments of the invention it may be provided that the distance between the two shoulders is greater than the distance, measured in the direction parallel to the rotation axis of the brake shaft, of the outer edges of the region in which on braking, a clamping force originating from the brake shaft is applied to the pressure piece.

In other words, in this embodiment of the invention, the two shoulders with the respective stops lie further apart than the width of the force application region. Again, mechanical advantages are achieved.

Disk brakes according to embodiments of the invention preferably have a brake caliper, in particular a sliding caliper. In other words, this is preferably a sliding caliper disk brake.

In a further preferred embodiment of the invention, on actuation, the brake shaft rests on the brake caliper, in particular on its rear wall. In this way, the clamping force can be transmitted to a further brake pad located on the wheel side of the brake disk.

In principle, the support of the brake shaft on the brake caliper may take any arbitrary form. According to embodiments of the invention, this support is preferably provided via a sliding block. Such a sliding block may in some cases, by corresponding sliding, prevent a seizing of the elements involved in application of the brakes.

According to embodiments of the invention, further preferably a third limiting device is provided, which limits to a predefined third extent the displaceability of the sliding block relative to the brake disk in at least one direction parallel to the main plane of the brake disk. Such a limiting device may in particular be useful on mounting of the brakes, namely for example as protection against loss of the sliding block.

In a further preferred embodiment of the invention, it may be provided that the third limiting device has a protrusion which, in mounted state, protrudes into a recess.

Again, there are two possibilities here: the protrusion may be formed on the sliding block while the recess is formed on the brake caliper. Evidently the reverse may also apply, with a recess on the sliding block and a protrusion on the brake caliper.

The predefined third extent should again be selected such that, where necessary, sufficient play is provided for compensatory slip movements.

The recess according to embodiments of the invention is preferably a blind hole.

The disk brake shown in FIGS. 1-4 includes a brake pad 10 on the application side and a brake pad 12 on the wheel side, which lie on opposite sides of a brake disk (not shown in the drawing). The main plane of the brake disk is however drawn and carries reference sign E. Furthermore, the disk brake includes a brake caliper 14 which is a sliding caliper.

A brake shaft belonging to an application device is designated with reference 16. Its rotation axis is marked with reference D. On the side facing away from the application-side brake pad 10, the brake shaft 16 rests on the brake caliper 14 via sliding blocks 18, 20. The sliding blocks each have a protrusion 22, 24 which engages in a blind hole 26 and 28 respectively.

On the side facing the application-side brake pad 10, the brake shaft 16 rests on a pressure piece 34 via rotary bearings 30, 32. The pressure piece 34 rests on the application-side brake pad 10 via an adjustment screw 36 and a ram 38.

If the brake shaft 16 is turned, because of its eccentric design a spread occurs which presses the rotary bearing 30, 32, the pressure piece 34, the adjustment screw 36, the ram 38 and finally the application-side brake pad to the left in FIG. 1, against the brake disk, whereas the brake caliper 14 moves to the right and hence the wheel-side brake pad 12 is pressed against the brake disk from the other side.

The pressure piece 34 has a first shoulder 40 and a second shoulder 42. A first stop 44 is formed on the first shoulder 40, which cooperates with a second stop 46 of the brake shaft 16 such that it limits a displacement of the brake shaft parallel to its rotation axis D, towards the top in FIG. 1.

In the same way, a third stop 48 is formed on the second shoulder 42, which cooperates with the fourth stop 50 on the brake shaft 16 such that it limits a displacement of the brake shaft 16 parallel to the rotation axis D, towards the bottom in FIG. 1. A slight play is provided between the first stop 44 and the second stop 46, and between the third stop 48 and the fourth stop 50 respectively, which allows a twisting of the brake shaft 16 about the rotation axis D but at the same time secures the brake shaft 16 against displacement in the direction parallel to the rotation axis D.

The pressure piece 34 is also secured against displacement in the direction parallel to the rotation axis D. For this, a fifth stop 52, a sixth stop 54, a seventh stop 56 and an eighth stop 58 are used. The fifth stop 52 and the seventh stop 56 are formed on the brake caliper 14 or held immovable relative thereto, while the sixth stop 54 and eighth stop 58 are formed on the pressure piece 34, so that the pressure piece 34 is held reliably in the direction parallel to the rotation axis D. Again, a play exists between the fifth stop 52 and the sixth stop 54, and between the seventh stop 56 and eighth stop 58 respectively, such that a reliable security against displacement is guaranteed but nonetheless a movement of the pressure piece 34 is possible in the right-left direction in FIG. 1, i.e. perpendicular to the main plane E of the brake disk.

The fifth and seventh stops 52, 54 provide a first limiting device for the displaceability of the pressure piece 34. The same applies to the sixth and eighth stops 56, 58. The first shoulder 40 with the first stop 44 and the second stop 46 constitutes a second limiting device for the displaceability of the brake shaft 16. The same applies to the second shoulder 42 with the third stop 48 and the fourth stop 50.

Since, according to the description above, the pressure piece 34 is secured against displacement relative to the brake caliper 14 in the direction parallel to the rotation axis D, and the brake shaft 16 is secured against displacement relative to the pressure piece 34 parallel to the rotation axis D, as a whole the brake shaft 16 is secured against displacement relative to the brake caliper 14 in the direction parallel to the rotation axis D, without it being necessary to arrange or form corresponding stops, guide strips or similar in the interior region of the brake caliper 14 which is difficult to access, so production of the brake is particularly simple. In addition, deformations of the brake caliper 14, which occur in the region of the brake shaft 16 on application of the brakes, cannot reduce the functional mobility of the brake shaft 16 because no guide strips or similar are present in this area. On the contrary, the deformations of the brake caliper 14 normally occurring on application rather lead to an increase in the play between the fifth stop 52 and the sixth stop 54, or between the seventh stop 56 and eighth stop 58 respectively, so that the brake can be applied particularly reliably.

As explained above, the clamping force from the brake shaft 16 is transferred to the pressure piece 34 via the rotary bearings 30 and 32. The outer edges of the rotary bearings 30 and 32 thus constitute the limits of the region B in which, on braking, an clamping force originating from the brake shaft 16 is transferred to the pressure piece 34. The first shoulder 40 and the second shoulder 42 lie outside said region B, which entails considerable mechanical advantages. The distance a between the first shoulder 40 and the second shoulder 42 is greater than the distance b of the two said outer edges of the rotary bearings 30, 32 which limit said application region B of the clamping force.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A disc brake, comprising:
   a brake disc,
   a brake caliper,
   a brake shaft having a rotation axis that lies parallel to a main plane of the brake disc,
   a sliding block configured to support the brake shaft on the brake caliper during actuation,
   a brake pad lying on a same side as the brake shaft relative to the brake disc,
   a pressure piece disposed between the brake shaft and the brake pad,
   a first limiting device configured to limit, to a predefined first extent, the displaceability of the pressure piece relative to the brake disc in a direction parallel to the rotation axis of the brake shaft,
   a second limiting device configured to limit, to a predefined second extent, the displaceability of the brake shaft relative to the brake disc in a direction parallel to the rotation axis of the brake shaft, the second limiting device comprising a first stop on the pressure piece and a second stop on the brake shaft that cooperates with the first stop in the sense of limiting the displaceability, and
   a third limiting device configured to limit, to a predefined third extent, a displaceability of the sliding block relative to the brake disc in at least one direction parallel to the main plane of the brake disc,
   wherein on actuation, the brake shaft presses the pressure piece and hence the brake pad against the brake disc,
   wherein the third limiting device has a protrusion which, in a mounted state, protrudes into a recess, and
   wherein the recess is a blind hole.

2. The disc brake as claimed in claim 1, wherein the first stop lies outside a first region in which, on braking, a clamping force originating from the brake shaft is applied to the pressure piece.

3. The disc brake as claimed in claim 1, wherein the second limiting device comprises at least one shoulder on the pressure piece.

4. The disc brake as claimed in claim 3, wherein, the second limiting device comprises two shoulders, and wherein a distance (a) between the two shoulders is greater than a distance (b), measured in a direction parallel to the rotation axis of the brake shaft, of the outer edges of the first region.

5. The disc brake as claimed in claim 1, wherein the brake shaft rests on a rear wall of the brake caliper via the sliding block.

6. The disc brake as claimed in claim 5, wherein the protrusion is located on the sliding block and the blind hole is located in the rear wall of the brake caliper, or
   wherein the protrusion is located on the rear wall of the brake caliper and the blind hole is located on the sliding block.

7. The disc brake as claimed in claim 1, further comprising:
   a second sliding block configured to support the brake shaft on the brake caliper during actuation; and
   a fourth limiting device configured to limit, to a predefined fourth extent, a displaceability of the second sliding block relative to the brake disc in at least one direction parallel to the main plane of the brake disc,
   wherein the fourth limiting device has a protrusion which, in a mounted state, protrudes into a second recess, and
   wherein the second recess is a second blind hole.

8. The disc brake as claimed in claim 1, wherein the sliding block is configured to slide relative to the brake caliper.

* * * * *